Oct. 18, 1955 J. A. EUBANKS 2,720,732
GRIDDLE STONE HOLDER
Filed Sept. 18, 1953 3 Sheets-Sheet 1
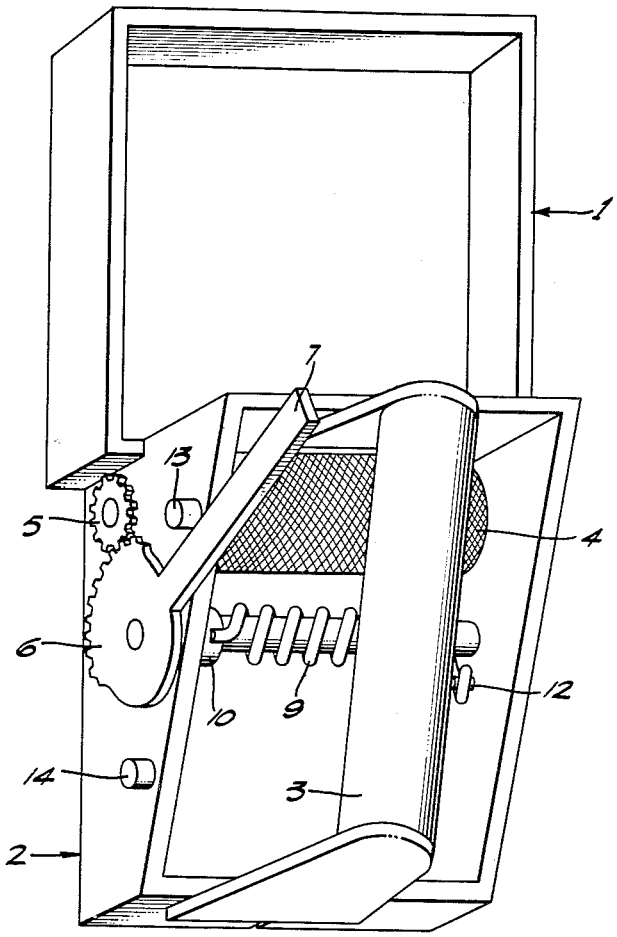
FIG. 1.
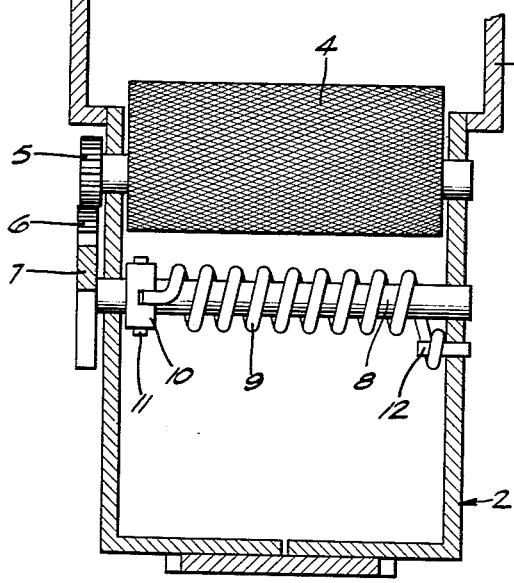
FIG. 2.
JAMES A. EUBANKS
INVENTOR.
BY 
ATTORNEY Oct. 18, 1955  J. A. EUBANKS  2,720,732
GRIDDLE STONE HOLDER Filed Sept. 18, 1953  3 Sheets-Sheet 3

JAMES A. EUBANKS
INVENTOR.

BY
ATTORNEY

United States Patent Office 2,720,732
Patented Oct. 18, 1955

2,720,732
GRIDDLE STONE HOLDER
James A. Eubanks, Bakersfield, Calif.
Application September 18, 1953, Serial No. 381,010
9 Claims. (Cl. 51—205)

This invention relates to useful improvements in griddle stone holders used in the process of cleaning carbon from the surface of griddles, particularly commercial griddles as are used in restaurants and hotels.

Some popular type griddle stones now being used, in place of the conventional pumice stone, are synthetic, of a lightweight abrasive material, of a parallelepiped design, usually 4-4-9 inches in size, and they cut the carbon fast and also abrade fast.

The primary object of this invention is to provide a griddle stone holder embodying a mechanism adapted to automatically grip and release a griddle stone of the above described type, and to hold said griddle stone in a vertical or upright position. By attaching the device to the lower portion of a griddle stone, near the grinding surface, less effort is required to hold it upright, affording more effort to be applied to the grinding process. As the griddle stone abrades the device is released and reset higher on the shank of the latter until nearly all of it is used.

Another important object of hte device is to provide a griddle stone holder embodying a rotatable knurled cam to further grip a griddle stone when manual bearing down pressure is applied to grind a griddle.

Another important advantage of the invention is to provide a device of the character set forth embodying a novel construction and arrangement of a thin straplike casing around three sides of a griddle stone, permitting it to work in close corners and sides of griddles that have splash boards, the fourth or operating handle side acting as a shield to protect the hands from splashing hot grease.

All the foregoing and still further objects and advantages of the invention will become apparent from a study of the accompanying specification and drawings, and wherein:

Fig. 1 is a perspective view of the entire device.

Fig. 2 is a horizontal cross section view showing a fragmentary portion of the casing and the mechanism in the frame below the operating handle.

Figure 3:
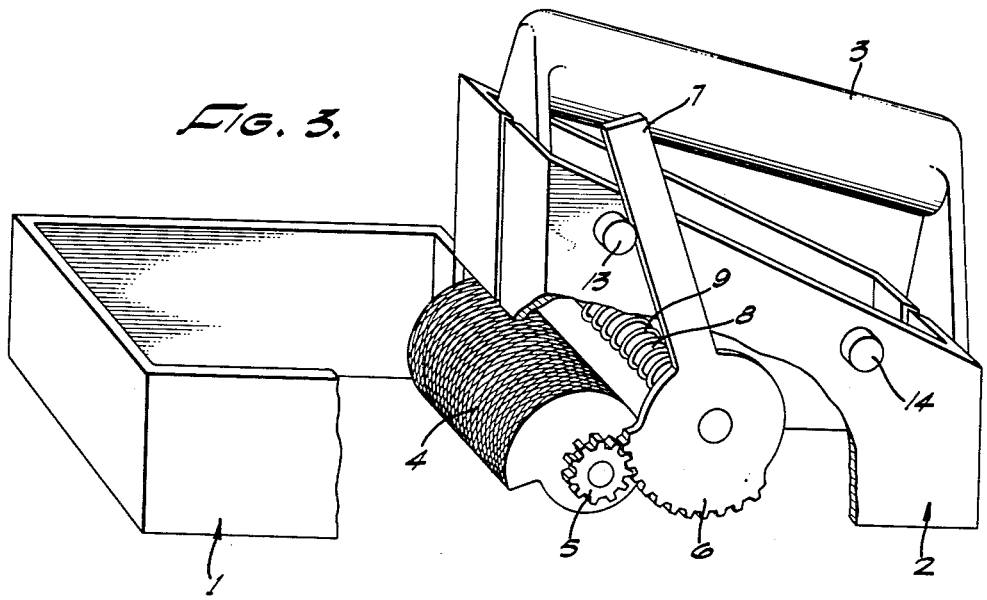
Fig. 3 is a perspective view with a portion of the casing torn out to disclose the knurled cam and relative parts.

Referring to the drawings in detail, Figure 1 illustrates a rectangular straplike casing 1 laterally extending on one side thereof to form a handle frame 2, the face or upper portion of the latter acting as a portion of that wall of the casing (see Figure 3) and supporting an operating handle 3 that is attached to the handle frame in a manner suitable to the trade, the latter being divided at the upper and lower ends to permit assembly of the mechanism. An elongated cam 4 is spindled at each end and mounted centrally and adjacent the casing in the handle frame, in a rotatable manner adapted to communicate with the interior of the casing by means of the periphery of the cam. (See Figure 2.) An elongated spindle at one end of the cam is provided for a fixed and externally mounted spur gear 5 that is in mesh with a lever gear 6 provided with a lever 7. The lever gear is fixed to a jack shaft 8, mounted rotatably, parallel and in a manner similar to the cam in the handle frame, it being located in the latter toward the lower end to permit the periphery of the rotatable cam to clear it and its relative parts, and high enough to keep the periphery of the lever gear from extending below the lower edge. The lever stops 13 and 14 are externally attached to the wall of the handle frame in a manner suitable to the trade, and at determinate positions to control the rotating action of the cam 4 by means of the lever 7.

Figure 2 illustrates to advantage the knurled cam 4 and the jack shaft 8, both of which are rotatably mounted in the handle frame 2, cam 4 and shaft 8 being operatively connected by means of the spur gear 5 and lever gear 6. The periphery of the cam extends into the shown fractional portion of the casing 1. A spiral spring 9 is loose fitted over the jack shaft with one end elongated to fit a suitable notch in a hub bushing 10 fixed to the shaft by means of a pin 11 extending through the bushing and shaft, holding the latter in position and facilitating a tension adjustment of the spiral spring, the opposite end of the latter being anchored to the interior wall of the handle frame by means of an anchor pin 12 fixed to the frame in a manner suitable to the trade.

Figure 4:
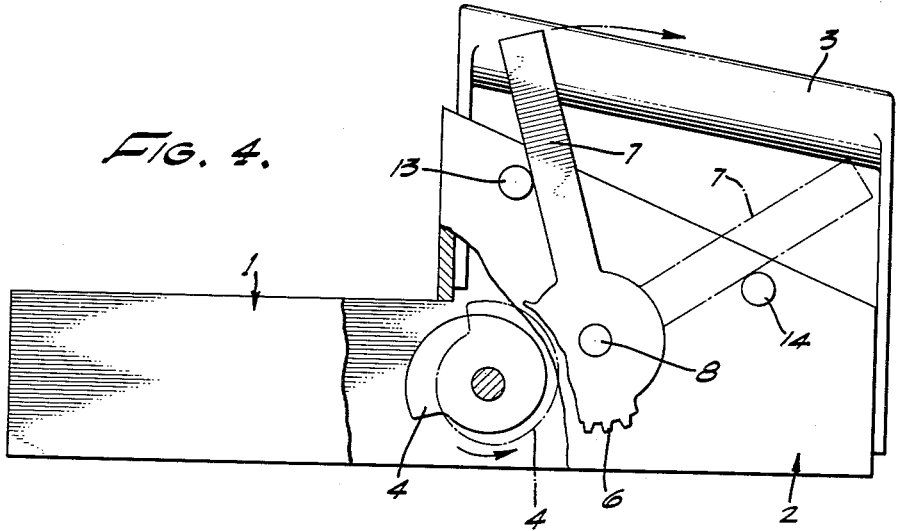
Fig. 4 is a diagrammatic sketch indicating the action of the knurled cam and the resilient lever from one extreme position to the other.

Figure 3 illustrates the elongated knurled cam 4 in communication with the lever gear 6 by means of the spur gear 5. The lever 7 is pressed against the stop 13 by means of the tension wound in the spiral spring in communication with the hub bushing adapted to actuate the jack shaft, lever gear, spur gear and cam, with the longest peripheral radius of the cam communicating with the interior of the casing 1. When the resilient lever 7 is manually pulled from the stop 13 to the stop 14, a further tension is wound in the spring and the cam is rotated about ¾ revolution in a counterclockwise manner in Figure 3 by means of the above set forth actuating arrangement, causing the shortest peripheral radius of the cam to be flush with the inside wall of the casing or the face of the handle frame 2, 2 (this action illustrated by the dotted or indicating lines in Figure 4). When the device is in the above described position it will tolerate a griddle stone.

Figure 5:
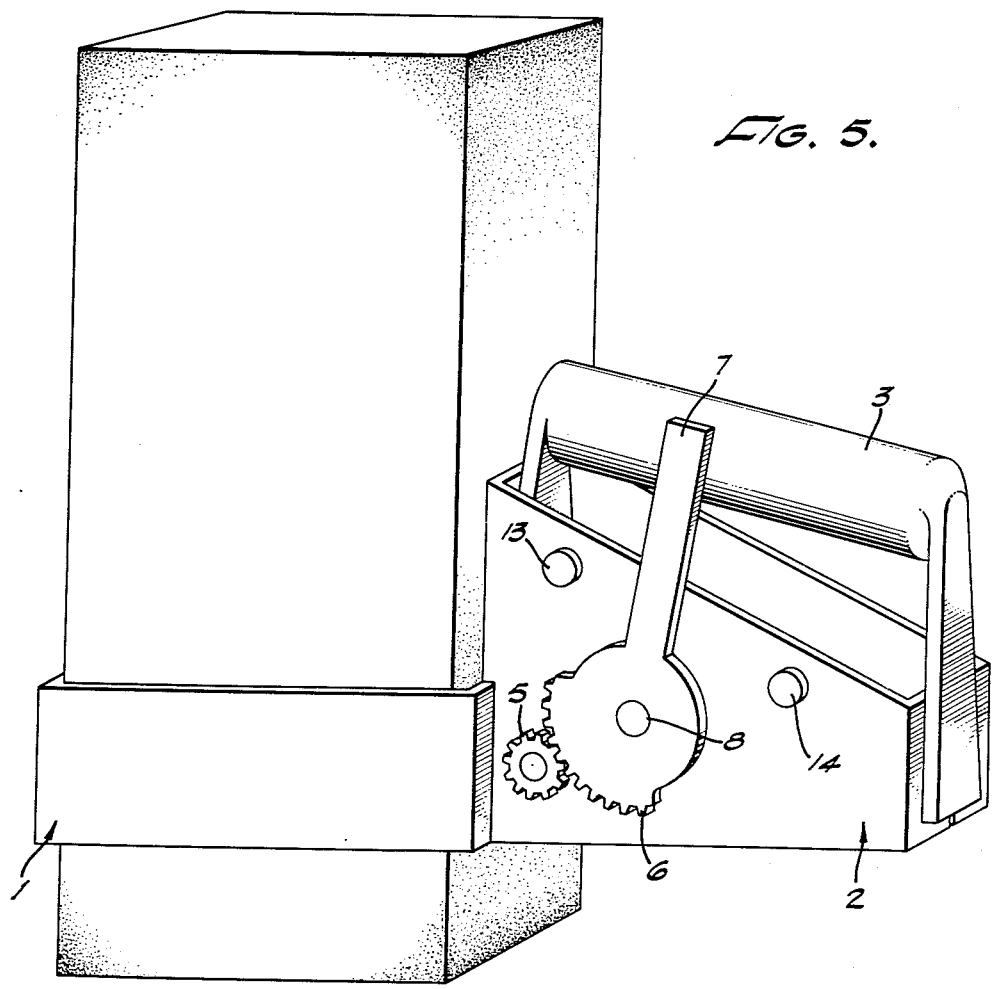
Fig. 5 is a side elevation perspective view illustrating the device attached to the lower portion of a griddle stone.

Referring to Figure 5: Assuming the device herein set forth is particularly designed for a griddle stone of a certain size, and the latter is inserted in the device while it is in the above described position, then the resilient lever is released, the tension established in the spiral spring will rotate the knurled cam in a clockwise manner causing it to abut against the griddle stone, by means of the cam periphery, forcing the griddle stone against the far wall of the casing and establishing a frictional grip on said griddle stone. The tension wound in the spiral spring is of sufficient strength to lift the weight of a griddle stone by means of this frictional grip. This frictional grip is further established by a manual bearing down pressure applied to the operating handle in the process of grinding a griddle. The latter action will be disclosed by a study of Figure 4.

Having described the invention, what I claim is:

1. A griddle stone holder including a casing adapted to receive a griddle stone, a frame integrally connected to said casing, an operating handle attached to said frame, an elongated cam having a gripping surface rotatably mounted in said frame with a portion of said gripping surface in communication with said casing, spring means for rotating said cam in one direction into gripping engagement with a griddle stone mounted in said casing and means for rotating said cam in the opposite direction to release the griddle stone.

2. A griddle stone holder including a griddle stone casing having a stone receiving passage therethrough, a frame integrally connected to said casing, an operating handle attached to said frame, an elongated cam having a gripping surface rotatably mounted in said frame with a portion of said gripping surface in communication with said passage, spring means for rotating said cam in one direction into gripping engagement with a griddle stone mounted in said passage and means for rotating said cam in the opposite direction to release the griddle stone.

3. A griddle stone holder including a casing adapted to receive a griddle stone, a frame integrally connected to said casing, an operating handle attached to said frame, an elongated cam having a gripping surface rotatably mounted in said frame with a portion of said gripping surface in communication with said casing, spring means for rotating said cam in a direction to move said communicating portion of said cam gripping surface upwardly with respect to said casing into gripping engagement with a griddle stone mounted in said casing, whereby an upward force on the griddle stone will tighten the gripping engagement of said cam on the stone, and means for rotating said cam in the opposite direction to release said griddle stone.

4. A griddle stone holder for holding a griddle stone in an upright position including a griddle stone casing having a substantially vertical stone receiving passage therethrough, a frame integrally connected to said casing, an operating handle attached to said frame, an elongated cam having a gripping surface rotatably mounted in said frame with a portion of said gripping surface in communication with said passage, spring means for rotating said cam in a direction to move said communicating portion of said cam gripping surface upwardly with respect to said casing into gripping engagement with a griddle stone mounted in said passage, whereby an upward force on the griddle stone will tighten the gripping engagement of said cam on the stone, and means for rotating said cam in the opposite direction to release the griddle stone.

5. A griddle stone holder including a casing adapted to receive a griddle stone, a frame integrally connected to said casing, an operating handle attached to said frame, an elongated cam having a gripping surface rotatably mounted in said frame with a portion of said gripping surface in communication with said casing, spring means for rotating said cam in one direction into gripping engagement with a griddle stone mounted in said casing and a release lever rotatably mounted on said casing, said release lever being in geared communication with said cam whereby actuation of said lever will rotate said cam in the opposite direction to release the griddle stone.

6. A griddle stone holder including a casing adapted to receive a griddle stone, a frame integrally connected to said casing, an operating handle attached to said frame, an elongated cam having a gripping surface rotatably mounted in said frame with a portion of said gripping surface in communication with said casing, spring means for rotating said cam in a direction to move said communicating portion of said cam gripping surface upwardly with respect to said casing into gripping engagement with a griddle stone mounted in said casing, whereby an upward force on the griddle stone will tighten the gripping engagement of said cam on the stone, and a release lever rotatably mounted on said casing, said release lever being in geared communication with said cam whereby actuation of said lever will rotate said cam in the opposite direction to release the griddle stone.

7. A griddle stone holder including a casing adapted to receive a griddle stone, a frame integrally connected to said casing, an elongated cam having a gripping surface rotatably mounted in said frame with a portion of said gripping surface in communication with said casing, a lever shaft rotatably mounted in said frame and in geared engagement with said cam, a helical spring mounted on said shaft and operatively engaged between said shaft and said frame to cause rotation of said cam in one direction into gripping engagement with a griddle stone mounted in said casing, and a release lever integrally connected to said lever shaft whereby actuation of said lever against the action of said spring will rotate said cam in the opposite direction to release the griddle stone.

8. A griddle stone holder of the class described comprising a casing, an operating handle, a handle frame integrally connected to said casing and embodying an elongated, rotatably mounted cam having a gripping surface, said cam being adapted to grip a griddle stone when rotated in one direction and to release said griddle stone when rotated in the opposite direction, and spring means for rotating said cam into gripping engagement with said griddle stone.

9. A griddle stone holder of the class described comprising a casing, an operating handle, a handle frame integrally connected to said casing and embodying an elongated, rotatably mounted cam having a gripping surface, said cam being adapted to grip a griddle stone when rotated in a clockwise manner and to release said griddle stone when rotated in a counter-clockwise manner and spring means for rotating said cam in a clockwise manner.

References Cited in the file of this patent

UNITED STATES PATENTS

| 122,064 | Saunders | Dec. 19, 1871 |
| 522,994 | Lynch | July 17, 1894 |
| 1,100,951 | Brown | June 23, 1914 |
| 2,280,767 | Ferragano | Apr. 21, 1942 |